(12) United States Patent
Blackburn et al.

(10) Patent No.: US 7,137,646 B2
(45) Date of Patent: Nov. 21, 2006

(54) PRESSURIZED GAS RELEASE MECHANISM

(75) Inventors: Jeffery S. Blackburn, Lake Orion, MI (US); Tsuneo Chikaraishi, Shiga (JP); Kanji Yano, Shiga (JP)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 349 days.

(21) Appl. No.: 10/713,291

(22) Filed: Nov. 14, 2003

(65) Prior Publication Data
US 2005/0052007 A1 Mar. 10, 2005

Related U.S. Application Data

(60) Provisional application No. 60/426,538, filed on Nov. 14, 2002.

(51) Int. Cl.
*B60R 21/26* (2006.01)
(52) U.S. Cl. ..................................... 280/737
(58) Field of Classification Search ................ 280/736, 280/737, 740, 741; 137/68.13, 68.19, 68.22
See application file for complete search history.

(56) References Cited

U.S. PATENT DOCUMENTS 5,700,030 A * 12/1997 Goetz .......................... 280/736
6,206,420 B1 * 3/2001 Skanborg et al. ........... 280/737
6,247,725 B1 6/2001 Moller ....................... 280/737

* cited by examiner

*Primary Examiner*—Faye M. Fleming
(74) *Attorney, Agent, or Firm*—L.C. Begin & Associates, PLLC

(57) ABSTRACT

An inflator 10 of a vehicle occupant protection system, for example, contains an elongated housing 12 having a first end 14 and a second 16. The gas generator 10 includes a sealed pressurized gas supply or gas tank 18 in fluid communication with the first end 14 upon inflator 10 operation. A first seal 36 seals the first end 14 prior to gas generator 10 operation. A notched support member 56 is wedged within the housing 12 and fixes the first seal 36 against a sealed opening 24 of the gas tank 18, thereby preventing fluid flow during gas generator 10 inactivity. Upon gas generator 10 activation, the support member 56 is fractured by a force produced by an initiator 68 thereby releasing pressurized gas into the first end 14 and through the housing 12.

14 Claims, 2 Drawing Sheets

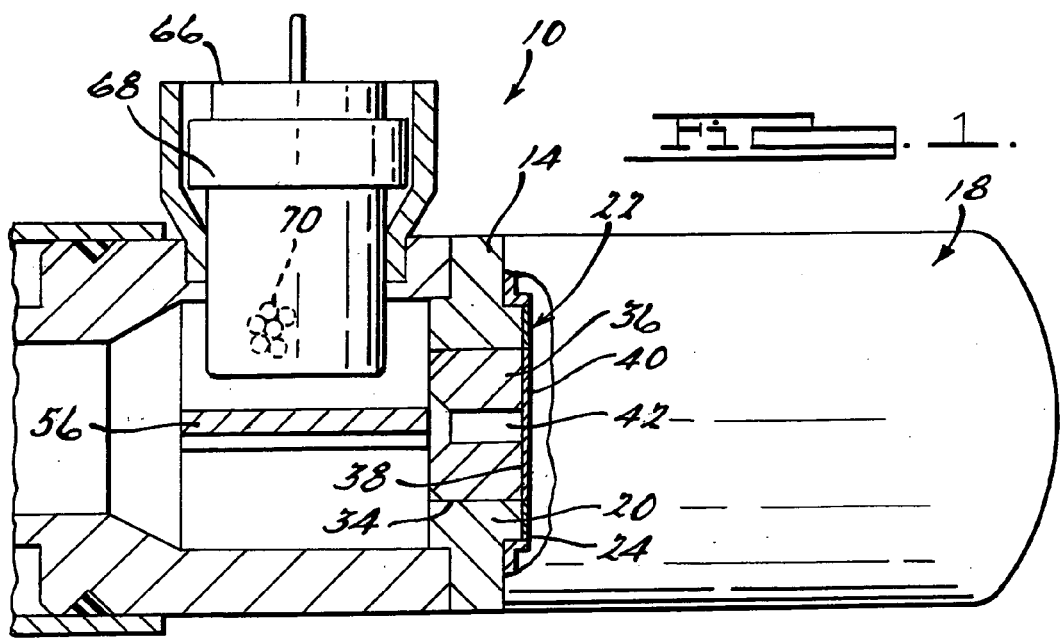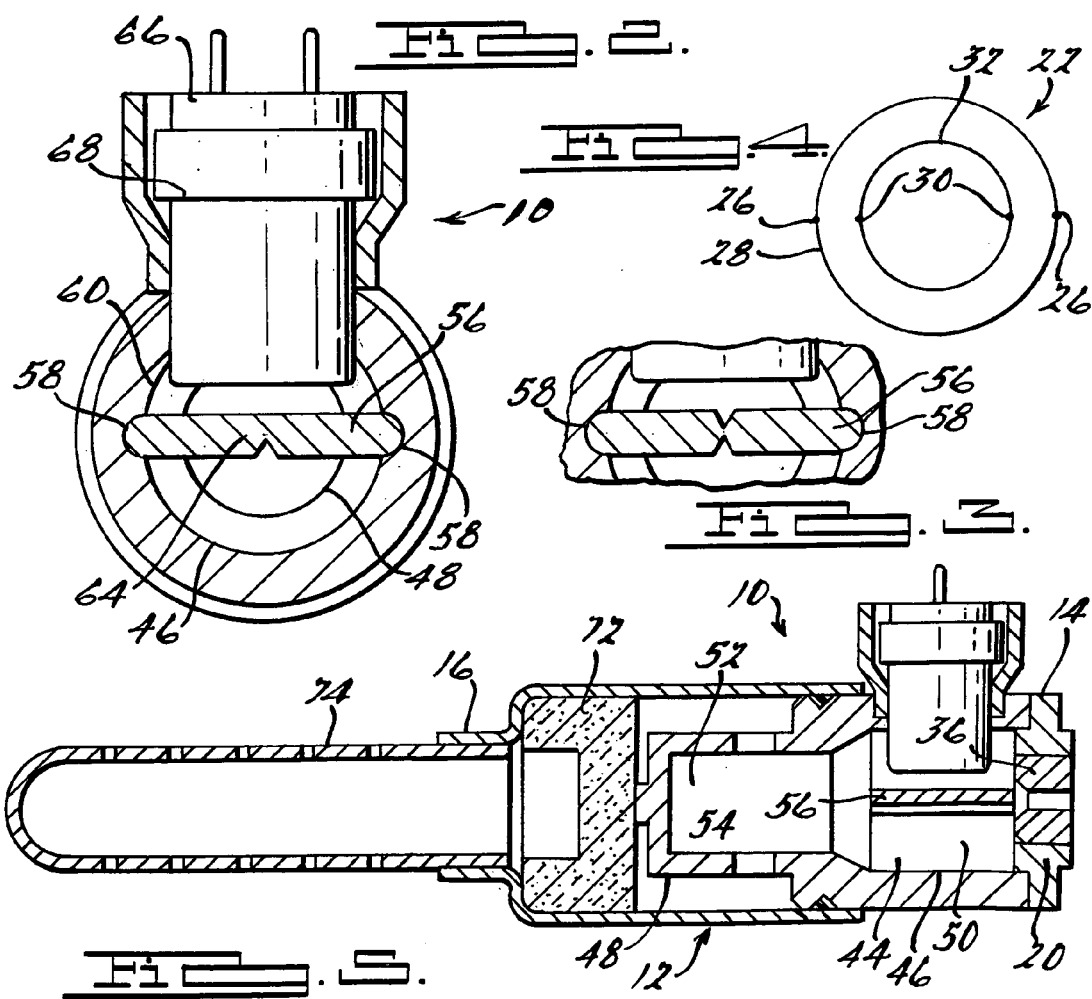

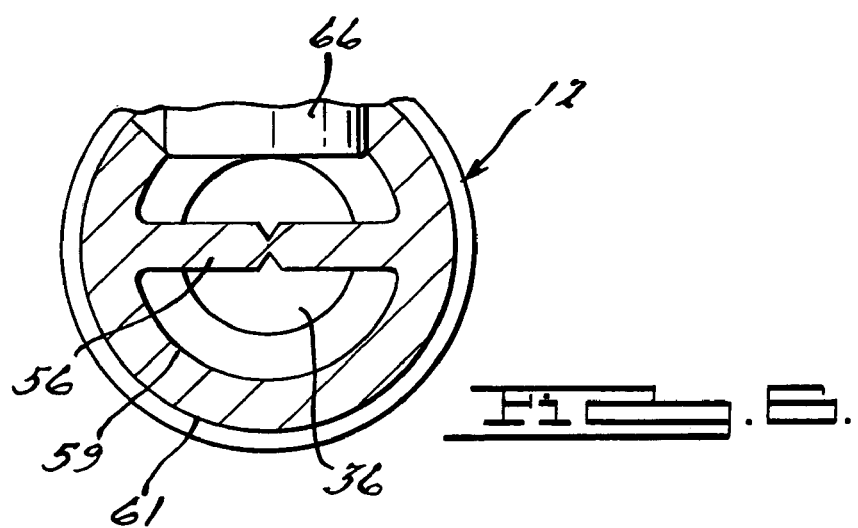

PRESSURIZED GAS RELEASE MECHANISM

CROSS-REFERENCE TO RELATED APPLICATIONS

This application claims the benefit of provisional application Ser. No. 60/426,538 filed on Nov. 14, 2002.

BACKGROUND OF THE INVENTION

The present invention relates to gas generators used to inflate air bags in an automobile occupant protection system and, more particularly, to a stored gas inflator. In accordance with the present invention, an improved release system for stored gas within a pressurized canister is provided.

Inflation systems for deploying an air bag in a motor vehicle generally employ a gas generator in fluid communication with an uninflated air bag. The gas generator is typically triggered by a firing circuit when the sensed vehicle acceleration exceeds a predetermined threshold value, as through the use of an acceleration-responsive inertial switch.

Air bag inflation systems often utilize a stored gas generator housed within the B-pillar of the car, for example. Hybrid gas generators are typical and contain pressurized gas that is released upon receipt of a predetermined signal. An ongoing challenge is to reduce the time required to release the stored gas upon a crash event. Furthermore, improved safety and reduced manufacturing costs are also ongoing concerns. Improvements in any of these areas would provide an advantage over state-of-the-art gas release systems.

Other stored gas release systems are known. For example, U.S. Pat. No. 6,206,420, herein incorporated by reference, describes a device for the introduction of pressurized gas into an airbag.

SUMMARY

In accordance with the present invention, a gas generator includes a housing having a first end and a second end, and an inner peripheral wall defining a plenum for passage of a pressurized gas upon gas generator activation. The first end of the housing fluidly communicates with a pressurized gas supply or gas tank upon gas generator activation, thereby supplying pressurized fluid flow through the housing. Prior to gas generator activation, a first seal covering the first end prevents pressurized fluid flow through the housing prior to activation of the gas generator. A notched support member is fixed within the plenum and against the first seal thereby countering an outer bias on the seal from the pressurized gas, and thus preventing pressurized fluid flow prior to the gas generator activation.

An initiator is fixed within the housing and fluidly communicates with the plenum upon gas generator activation. Upon gas generator activation, the initiator produces a sharp blast of gas thereby creating a force sufficient to fracture the notched support member and thus release pressurized gas into the first end. Fracture of the notched support member eliminates the support's bias against the first seal, thereby facilitating rupture of the first seal as the gas pressure is exerted thereagainst.

BRIEF DESCRIPTION OF THE FIGURES

FIG. 1 is a side view of a first portion of a pressurized gas generator and a gas release mechanism in accordance with the present invention.

FIG. 2 is cross-sectional view of a front portion of a pressurized gas generator and a gas release mechanism in accordance with the present invention.

FIG. 3 is an alternate design of the support member shown in FIG. 2.

FIG. 4 is a view of a preferred second seal covering the gas tank as shown in FIG. 2.

FIG. 5 is a side view of a second portion of a pressurized gas generator and a gas release mechanism in accordance with the present invention.

FIG. 6 is a sectional view of an annular insert forming a support member across the plenum.

DETAILED DESCRIPTION OF THE PREFERRED EMBODIMENTS

As shown in the figures, a pressurized gas release mechanism 10 comprises an elongated housing 12 formed, for example, from a stamped rigid material such as carbon steel or stainless steel. The housing 12 contains a first end 14 and a second 16. A pressurized or stored gas bottle 18 is fixed to the first end 14 and upon activation, is in fluid communication therewith. An annular plate 20 is welded or otherwise fixed to the housing 12 at first end 14. A stamped or otherwise formed burst disc or seal 22 covers an opening 24 of the gas bottle, tank, or pressurized supply 18, thereby sealing and preventing release of pressurized gas during normal vehicular operation. In one aspect of the present invention, the burst disc 22 is preferably welded at four points along its diameter. Two of the welds 26 are formed along an outer circle 28 of the disc 22 and connect the disc 22 to the weld plate 20. Two additional welds 30 are formed along an inner circle 32 concentrically oriented within outer circle 28, thereby connecting the burst disc 22 to a support member 56 (described below). Although optional, the circular portion 32 may be perforated or formed as a weakened portion of disc 22. Upon inflator activation, rupture of portion 32 from disc 22 is therefore promoted, thereby creating an annular conduit but minimizing metallic shards when releasing pressurized gas into the housing 12. Typical state of the art burst discs often feature a plurality of weakened portions that form petals once gas is exerted thereagainst. A concern is that the petals of this design may fracture and therefore require enhanced or more robust filtering as compared to the present burst disc 20.

An annular wall 34 is formed within the annular plate 20. A cylindrical retainer or seal 36 is seated within and against the annular wall 34 and provides a bias or support to interface with an outer face 38 of the burst disc 22. One advantage of forming a weakened circular portion 32 and then supporting it by the cylindrical retainer 36 is to reduce the strength requirements of disc 22. In practice then, stainless steel rather than the conventional and more expensive proprietary INCONEL™ may be employed. Gas pressure exerted upon an inner face 40 of the burst disc 22 is thereby retained again during normal vehicular operation. An integral vent 42 is preferably axially machined within the retainer 36 thereby providing a vent in the case of over-pressurization of the gas bottle 18, during a fire for example.

A hollow diffuser 44 is machined or otherwise formed from steel or other suitable materials, and then welded or otherwise fixed within the housing 12. Diffuser 44 functions to distribute gas flowing from first end 14 through the diffuser 44 and out the second end 16. Diffuser 44 preferably telescopes from the first end 14 toward the second end 16, from a first wider circumference 46 to a narrower circumference 48, thereby resulting in a first larger plenum 50 and a second smaller plenum 52, respectively. A plurality of gas discharge orifices 54 is spaced about circumference 48. As shown in the figures, a preferred embodiment contains four gas discharge orifices 54 evenly spaced about the circumference 48.

A notched support member or wall 56, preferably extruded or made from aluminum, is laterally fixed across the relatively larger diameter of plenum 50 adjacent the first end 14. As used herein, the term "fixed" is meant to relate to any embodiment that provides a support member 56 spanning across plenum 50 during normal vehicular operation or prior to a crash event. When buttressed against the cylindrical retainer seal 36, support wall 56 prevents pressurized gas within the bottle 18 from rupturing the burst disc 22 during normal vehicular operation. As shown in FIGS. 2 and 3, in one embodiment a pair of opposing detents 58 is formed along an inner wall 60 of the larger plenum 50 thereby providing a structural support by engaging each end of the support member 56. Alternatively, as shown in FIG. 6, support member 56 may be formed integral to an annular insert 59, whereby the second periphery 61 of insert 59 is contoured to fit snugly within inner wall 60. This may for example present certain structural and manufacturing advantages. In yet another embodiment, support member 56 may be formed integral with inner wall 60 again presenting certain structural and manufacturing advantages.

However formed, support member 56 preferably has a first notched surface 62 and a second notched surface 64 opposite the first surface 62, whereby pressure exerted upon either surface results in ready fracture of the wall 56, thereby releasing the cylindrical retainer 36 and therefore the pressurized gas once the burst disc 22 gives way. As shown in FIG. 2, the support member 56 may of course be notched on one surface rather than both.

A micro gas generator 66 is crimped about the outer periphery of plenum 50 and extends through wall 60. An igniter or pyrotechnic initiator 68 is contained within the generator 66 and ignitably communicates with a gas generant 70 also contained within generator 66. Upon a crash event, the igniter 68 receives a signal from a crash sensor or accelerometer (not shown), for example, and then ignites the gas generant 70 to produce gas within the plenum 50. The gas pressure produced from the micro gas generator 66 thereby fractures the support wall 60 in fluid communication therewith and allows the gas pressure within the bottle 18 to fracture the burst disc 22, thereby driving the cylindrical retainer 36 through the annular wall 34. Gas pressure within the bottle 18 therefore is routed through the diffuser 44 and out the housing 12 into an airbag (not shown).

The propellant 70 may comprise any gas generant composition known for its utility in vehicle occupant protection systems. Co-owned U.S. Pat. Nos. 5,035,757, 5,756,929, 5,872,329, 6,077,371, 6,074,502, and 6,210,505 are herein incorporated by reference and exemplify, but do not limit gas generant compositions contemplated in accordance with the present invention.

In a preferred embodiment, the propellant 70 comprises a mixture of silicone as a fuel at about 10–25% by weight, and an oxidizer such as ammonium or potassium perchlorate at about 75–90% by weight. Silicone not only functions as a fuel but also functions as a binder thereby facilitating the formation of pliant cylindrical propellant extrusions.

The propellant 70 more preferably comprises silicone as a fuel at about 10–25% by weight; a perchlorate oxidizer such as ammonium, lithium, or potassium perchlorate; and a strontium salt such as strontium nitrate or strontium carbonate as a coolant, wherein the oxidizer and coolant comprise about 75–90% by weight of the propellant. The silicone may be purchased, for example, from General Electric or other well-known suppliers. The other gas generant constituents may be provided by suppliers or by manufacturing methods well known in the art.

The propellant composition 70 yet more preferably comprises, in percents by weight, 10–25% silicone, 75–90% oxidizer, 1–30% coolant, and 1–20% of a slag-forming constituent. The oxidizer may for example be selected from inorganic perchlorates and nitrates such as sodium perchlorate, potassium perchlorate, ammonium perchlorate, potassium nitrate, ammonium nitrate, and phase stabilized ammonium nitrate. The coolant may for example be selected from metal hydroxides such as aluminum hydroxide; metal carbonates such as calcium carbonate, magnesium carbonate, strontium carbonate, and sodium carbonate; and inorganic oxalates such as calcium oxalate, strontium oxalate, and ammonium oxalate. The slag-forming constituent may for example be selected from metal oxides such as aluminum oxide and iron oxide. It has been found that gas generating compositions containing silicone and a perchlorate oxidizer burn at relatively lower temperatures when a coolant, in accordance with the present invention, is added to the mixture. As a result, cooling requirements of gas generated within the gas release mechanism 10 can be substantially minimized.

If necessary, a filter or heat sink 72 made from expanded metal or carbon yarn for example, is housed at second end 16 within plenum 52 to filter the gas effluent travelling from plenum 50. A perforated tube 74 extends from the second end 16 such that upon inflator activation, the airbag (not shown) fluidly communicates therewith. A welded wire mesh filter 72 may be provided by Wayne Wire, Inc. of Kalkaska, Mich., for example.

It will be understood that the foregoing description of the present invention is for illustrative purposes only, and that the various structural and operational features herein disclosed are susceptible to a number of modifications, none of which departs from the spirit and scope of the present invention.

We claim:

1. A gas generator comprising:
   a housing having a first end, a second end, an opening in said first end for fluid flow into said housing, and an inner peripheral wall defining a plenum, said first end fluidly communicating with a pressurized gas supply upon gas generator activation thereby supplying pressurized fluid flow through the housing;
   a gas supply seal for sealing the pressurized gas supply prior to gas generator activation;
   a retainer seal positioned within said opening to support said gas supply seal against a force exerted thereon by a pressurized gas;
   a notched support member fixed within said plenum and against said first seal thereby preventing pressurized fluid flow prior to gas generator activation; and
   an initiator fixed within said housing and fluidly communicating with said plenum upon gas generator activation, wherein upon gas generator activation, said initiator creates a force sufficient to fracture said notched support member thereby releasing pressurized gas into said first end.

2. The gas generator of claim 1 wherein said pressurized gas supply includes a pressurized tank in fluid communication with said housing upon gas generator activation.

3. The gas generator of claim 2 wherein said pressurized tank has an aperture sealed by said gas supply seal to prevent fluid flow prior to gas generator activation, whereby upon gas generator activation, the sealed aperture is opened by a force of the pressurized gas to provide fluid communication between the pressurized tank and the fixes end of said housing.

4. The gas generator of claim 3 wherein said retainer seal has a first face adjacent to said gas supply seal, and said gas supply seal has a weakened portion approximately equal in area to said adjacent face of said retainer seal.

5. The gas generator of claim 1 further comprising a filter proximate to said second end and a plurality of gas exit apertures about said second end, whereby upon gas generator activation gas entering said first end passes through said filter and then exits said second end through said plurality of gas exit apertures.

6. The gas generator of claim 1 wherein said support member has a top surface and a bottom surface, said support member being notched on at least the bottom or the top surface.

7. The gas generator of claim 1 wherein said support member comprises an annular insert contoured to fit within said inner peripheral wall, and a notched portion integral to said annular insert and spanning across said plenum.

8. The gas generator of claim 1 wherein said support member is integral to said housing and extends from said inner peripheral wall and across said plenum.

9. A gas generator comprising:
a housing having a first end sealed by a first seal and a second perforated end, and an inner peripheral wall defining a plenum for gas flow therethrough;
a pressurized gas bottle containing an opening sealed by a second seal, said sealed opening juxtaposed with said sealed first end thereby providing fluid communication from said bottle through said first end upon gas generator activation;
a notched support member extending across said plenum and wedged against said inner peripheral wall, said support member biasing said sealed first end against said sealed opening thereby preventing fluid flow from said bottle through said first end, prior to gas generator activation; and
an initiator extending through said housing wherein upon gas generator activation, the initiator produces a force that fractures said notched support member to facilitate fluid flow through said housing.

10. A pressurized gas generator comprising:
a housing containing a first end and a second end, a first opening in said first end for fluid flow into said housing, a retainer seal fixed within said opening for prevention of fluid flow prior to gas generator activation, and an inner peripheral wall defining a plenum;
a pressurized gas bottle sealably connected to the first end, said gas bottle having a second opening defined by an annular periphery;
a burst disc fixed over said annular periphery for sealing of said second opening, wherein said burst disc is welded or otherwise fixed to said retainer seal, said seal frangible upon gas generator activation;
a notched support member wedged against said inner wall and against said retainer seal thereby providing a bias against the retainer seal and preventing gas fluid flow prior to gas generator activation; and
a pyrotechnic initiator fixed within said housing, wherein upon activation said initiator fluidly communicates with said plenum and produces a gas stream that fractures said notched support member thereby releasing gas pressure from said gas bottle.

11. The gas generator of claim 10 wherein said burst disc comprises a peripheral edge that congruently corresponds with said annular periphery, and a weakened portion that interfaces with said retainer seal, whereby upon gas generator activation said weakened portion is fractured from said burst disc as the pressurized gas is released into said housing.

12. The gas generator of claim 10 further comprising a pair of opposing detents formed within said inner wall whereby said notched support member is wedged within said pair of opposing detents thereby fixing said support member across said plenum and against said retainer seal.

13. A gas generator comprising:
a housing having a first end, a second end, and an inner peripheral wail defining a plenum, said first end fluidly communicating with a pressurized gas supply upon gas generator activation thereby supplying pressurized fluid flow trough the housing, said pressurized gas supply including a pressurized tank in fluid communication with said housing upon gas generator activation, said pressurized tank having a sealed aperture to prevent fluid flow prior to gas generator activation;
a first seal covering said first end thereby preventing pressurized fluid flow prior to gas generator activation;
a notched support member fixed within said plenum and against said first seal thereby preventing pressurized fluid flow prior to gas generator activation; and
an initiator fixed within said housing and fluidly communicating with said plenum upon gas generator activation,
said sealed aperture containing a second seal attached to said first seal, and said first seal having a first face adjacent to said second seal, said second seal having a weakened portion approximately equal in area to said adjacent face of said first seal, wherein upon gas generator activation, said initiator creates a force sufficient to fracture said notched support member, and the sealed aperture is opened by a force of the pressurized gas to provide fluid communication between the pressurized tank and the first end of said housing, thereby releasing pressurized gas into said first end.

14. A gas generator comprising:
a housing having a first end, and a second end, and an inner peripheral wall defining a plenum, said first end fluidly communicating with a pressurized gas supply upon gas generator activation thereby supplying pressurized fluid flow trough the housing;
a first seal covering said first end thereby preventing pressurized fluid flow prior to gas generator activation;
a notched support member fixed within said plenum and against said first seal thereby preventing pressurized fluid flow prior to gas generator activation, said support member including an annular insert contoured to fit within said inner peripheral wall, and a notched portion integral to said annular insert and spanning across said plenum; and
an initiator fixed within said housing and fluidly communicating with said plenum upon gas generator activation, wherein upon gas generator activation, said initiator creates a force sufficient to fracture said notched support member thereby releasing pressurized gas into said first end.

* * * * *